June 20, 1967 R. W. BURNS ETAL 3,325,835
COMBINATION HOOK AND KNIFE UNIT
Filed May 14, 1965
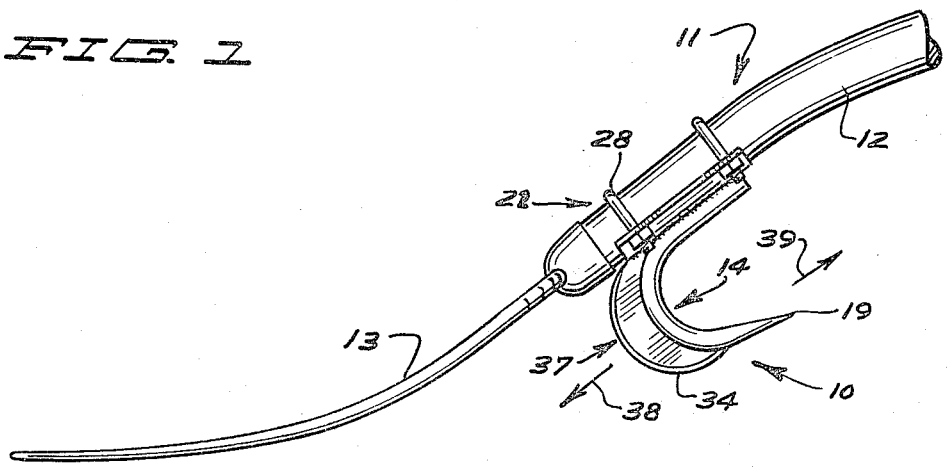
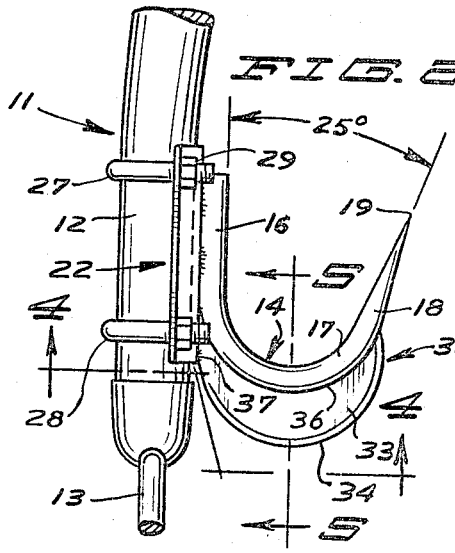
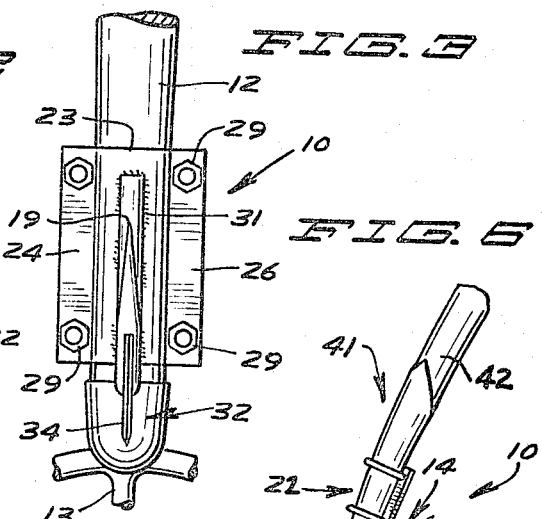
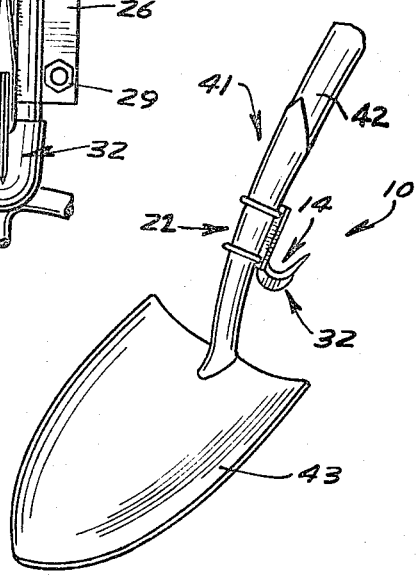
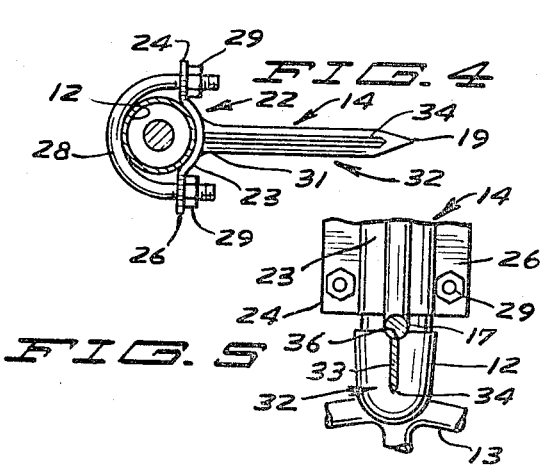
INVENTORS
Roy W. Burns
Elmer T. Burns
BY Braddock & Burd
ATTORNEYS

United States Patent Office 3,325,835
Patented June 20, 1967

3,325,835
COMBINATION HOOK AND KNIFE UNIT
Roy W. Burns and Elmer T. Burns, both of Box 241,
Chinook, Mont. 59523
Filed May 14, 1965, Ser. No. 455,740
9 Claims. (Cl. 7—14.3)

ABSTRACT OF THE DISCLOSURE

A combined hook and knife attachable to the lower end of a handle of a fork or shovel. The hook has a U-curved neck section. Joined to the back of the neck section is a flat crescent shaped knife having a convex curved cutting edge. The knife and hook are in a common plane and are attached to a clamp assembly used to secure the hook and knife to the lower end of the handle.

This invention relates to a hook and knife unit designed to be attached to a hand tool. More particularly the invention relates to a combination hook and knife attached to a hand tool, such as a fork or shovel. The knife has a forwardly directed cutting edge and the hook has a rearwardly directed point whereby a cutting action is obtained on push movement and a grabbing action is obtained on pull movement.

It is the object of the invention to provide an improved hook and knife unit in combination with a pitch fork so as to be usable to handle baled materials as hay or straw, and to cut the strands of the bales solely with pulling or pushing movements thereby reduce the time and effort in handling baled materials.

A further object of the invention is to provide a one-piece hook and knife unit attachable to a handle which when used eliminates bending of a person's body to achieve movement of and cutting operations on baled materials.

Another object of the invention is to provide a compact hook and knife unit which can be attached in a practical manner to conventional hand tools, as pitch forks and shovels, and does not interfere with the normal use of these hand tools.

Still a further object of the invention is to provide a combined hook and knife structurally related relative to each other so that the hook can be used without interference with the knife and the knife can be used with a minimum of interference, from the hook.

An additional object of the invention is to provide a rugged and versatile combination hook and knife unit which is simple and sturdy in construction, economical in cost, and reliable and efficient in use.

These and other objects and advantages of this invention will become readily apparent upon reference to the following description and accompanying drawing, wherein:

FIGURE 1 is a side view of the combination hook and knife unit attached to the tine end of a fork handle;

FIGURE 2 is an enlarged side of the hook and knife unit of FIGURE 1;

FIGURE 3 is a bottom plan view of the hook and knife unit of FIGURE 2;

FIGURE 4 is a sectional view taken along the line 4—4 of FIGURE 2;

FIGURE 5 is a sectional view taken along the line 5—5 of FIGURE 2; and

FIGURE 6 is a perspective view of a shovel equipped with the combination hook and knife unit of this invention.

Referring to the drawing there is shown in FIGURE 1, the combination hook and knife unit of this invention indicated generally at 10 mounted in assembled relation with a hand tool 11 shown as a conventional pitchfork. The hand tool has an elongated cylindrical handle having a lower end portion 12 secured to tines 13. The hook and knife unit 10 is clamped about the lower end portion 12 and projects downwardly therefrom in a plane extended substantially normal to the plane of the tines 13.

As shown in FIGURES 2 and 3, the hook and knife unit 10 comprises a hook indicated generally at 14 including a straight shank section 16 integral with a U-curved neck section 17. A tapered end section 18 terminating in a point 19 is connected to the outer end of the neck section 17 and defines the mouth of the hook. The end section 18 projects downwardly and rearwardly at an angle of about 25° with respect to the longitudinal axis of the shank 16. The hook 14 may be formed from a metal rod. The hook 14 is attached to a clamp assembly indicated generally at 22 comprising a plate having a U-shaped center section 23 and oppositely directed flanges 24 and 26. The opposite end sections of the flanges 24 and 26 have holes for receiving U-bolts 27 and 28 positioned about the handle end portion 12. Nuts 29 are threaded onto the ends of the U-bolts 27 and 28 projected through the flanges 24 and 26 to clamp the plate to the handle end portion 12. The straight shank section 16 of the hook is positioned along the longitudinal axis of the U-shaped section 23 of the plate and secured thereto by a continuous weld 31 or the like. As shown in FIGURE 2, the curved neck section 17 of the hook extends slightly below the forward end of the plate 22 and projects in a plane extended normal to the plane of the plate.

Referring to FIGURES 2 to 5 a flat knife indicated generally at 32 is secured by a weld or the like to the forward side of the curved neck section 17 of the hook 14. The knife 32 projects in the plane of the hook toward the tines 13. Knife 32 comprises a flat crescent-shaped blade 33 having convex curved cutting forward edge 34. The inner end of the cutting edge 34 joins with a flat side 37 welded to the plate center section 23. The rear edge 36 of the blade 33 has a curvature which conforms to the curvature of the U-curved neck section 17 of the hook 14 and is secured thereto. As best seen in FIGURE 3, the blade 33 has a width about ⅓ the diameter of the hook 14 and extends in the mid-plane of the hook. The outer portion of the cutting edge 34 terminates inwardly from the hook point 19 approximately in the area where the tapered end section 18 joins with the curved neck section 17.

The following example is given as an illustration of a specific combination hook and knife unit and is not intended to limit the shape, size or dimensions of either the hook 14 or knife 32. The hook 14 is a 7⁄16 inch diameter rod secured to a four inch long plate. The shank section 16 of the rod is 2⅜ inches long. The curved neck section 17 has a radius of curvature of 1¼ inch. The point 19 is 3¾ inches below the shank section 16 and defines the mouth of the hook. The flat blade 33 on the knife 32 has a thickness of ⅛ of an inch. The arcuate cutting forward edge 34 has a radius of curvature 1¾ inches having a center which lies in the longitudinal plane intersecting the mid-point of the curved neck section 17. Conventional 2¼ inch U-bolts are used in conjunction with the plate to form the clamp assembly 22.

In use, as shown in FIGURE 1, a combination hook and knife unit 10 is secured by the clamp assembly 22 to the tine end portion 12 of the fork 11. The unit 10 is positioned to extend in a downward direction substantially normal to the plane of the tines 13. The knife 32 projects in a forward direction similar to the tines 13 while the hook 14 projects in the opposite or rearward direction. In the handling of baled material or similar tied objects the pitchfork 11 is moved in a forward direction to force the knife 32 in the direction of the arrow 38 whereby the arcuate cutting edge 34 serves the bale cord. With the cutting edge 34 formed with an arcuate shape impact as well as saw cutting operations are simultaneously performed on the cord so that an efficient severing of the cord is accomplished. When the fork is pulled in a rearward direction indicated by arrow 39 the point 19 of the hook 14, projected rearwardly and downwardly, moves into the baled material so that the material may be easily handled.

With the knife 32 positioned behind and in the plane of the hook 14 the knife does not interfere with the operation of the hook upon movement of the fork in the direction of the arrow 39. The combination hook and knife 10 being attached to the end of a long handle can be used to cut the cords of baled material and subsequently move the material without bending the body of the user of the pitchfork.

As shown in FIGURE 6, the combined hook and knife unit 10 is attached to a shovel 41 having a handle 42 and a spade-shaped foot 43. The clamp assembly 21 is positioned about the lower end of the handle 42 adjacent the foot 43 with the knife 32 projected in a forward direction and the hook 14 projected in a rearward direction. The shovel 41 equipped with the combination hook and knife unit 10, shown in FIGURE 6, is particularly adapted for cutting and pulling the brush and weeds from irrigation ditches and canals.

In summary, the combination hook and knife unit 10 can be clamped about one end of an elongated member, such as the handle of a pitchfork or shovel. The elongated member can be moved so that the hook and knife unit has utility as a pull-hook and a push-cutter. The unit 10 has a hook 14 and a knife 32 secured together in a common plane so that the hook can be used without inteference from the knife and the knife can be used with a minimum of interference from the hook. With the unit 10 attached to the lower end of a handle a cutting action and a grabbing action may be accomplished without bending the body of the user.

Prior art: Roseman, 2,243,127, May 1941; Vosbikian et al., 2,377,730, June 1945; Kirkel, 3,074,752, January 1963; Redfield, 3,115,648, December 1963.

It is apparent that many modifications, substitutions, changes in form, and details of the combination hook and knife unit illustrated may be made without departing from the spirit and the scope of the invention. The specific example described is given by way of illustration only and the invention is intended to be limited only by the terms of the appended claims.

What is claimed is:
1. A combination hook and knife unit comprising
 (a) a hook having a straight shank section, a U-curved neck section and a tapered end section terminating in a point, said sections positioned in a common plane;
 (b) a knife including a crescent shaped flat blade having a convex curved cutting edge, said blade positioned in said common plane and secured to the outer side of the U-curved neck section, said blade having a width substantially less than the thickness of said neck section; and
 (c) a clamp assembly for attaching the hook and knife to an elongated handle, said assembly including plate means secured to said shank section and a portion of said blade.
2. A combination hook and knife unit comprising
 (a) a hook having a curved neck section, and an end section terminating in a point, said sections positioned in a common plane;
 (b) a knife including a flat blade having a convex curved cutting edge, said blade positioned in said common plane and joined with the outer side of the curved neck section; and
 (c) a clamp assembly for attaching the hook and knife unit to an elongated handle, said assembly including plate means joined with a portion of the blade and a portion of the hook.
3. In combination,
 (a) a hand tool having an elongated handle including a lower end portion;
 (b) a clamp assembly attached to said lower end portion, said clamp assembly including a plate member positioned longitudinally along the bottom side of the handle and means securing the plate member to the lower end portion of the handle;
 (c) hook means secured to said plate member and projected outwardly from said handle, said hook means having a straight shank section secured longitudinally to the plate member, a U-curved neck section and a tapered end section terminating in a point; and
 (d) a knife secured to said plate member and hook means, said knife including a flat crescent shape blade having a convex curved cutting edge, said blade positioned in the plane of the neck section and secured to the neck section along the center portion of the neck section, said blade having a width substantially less than the thickness of that neck section so that the blade does not interfere with the operation of the hook means whereby upon movement in a forward direction the cutting edge of the blade operates to perfect a cutting action and movement in the rearward direction predicates a grabbing action of the hook means.
4. The combination hook and knife unit defined in claim 1 wherein the plate means extends generally normal to said common plane.
5. The combination hook and knife unit defined in claim 2 wherein the plate means extends generally normal to said common plane.
6. The combination hook and knife unit defined in claim 2 wherein the flat blade has a crescent shape and extends around the entire outer side of the curved neck section.
7. A combination hook and knife unit comprising:
 (a) a hook having a shank section, a generally U-curved neck section and an end section terminating in a point, said sections positioned in a common plane;
 (b) a knife including a crescent shaped flat blade having a convex curved cutting edge, said blade located in said common plane and joined with the outer side of the U-curved neck section; and
 (c) a clamp assembly for attaching the hook and the knife to an elongated handle, said assembly including plate means secured to said shank section and a portion of said blade.
8. In combination,
 (a) a hand tool having an elongated handle including a lower end portion;
 (b) a clamp assembly attached to said lower end portion, said clamp assembly including a plate member located along said lower end portion and means securing the plate member to said lower end portion;
 (c) hook means secured to said plate member and projected outwardly from said handle, said hook means having a generally U-curved neck section and an end section terminating in a point; and
 (d) a knife secured to said plate member and hook means, said knife including a flat blade having a convex curved cutting edge, said blade positioned in a plane of the neck section and secured to the back of the neck section whereby upon movement in a forward direction the cutting edge of the blade operates to perfect a cutting action and movement in a rearward direction predicates a grabbing action of the hook means.
9. The combination defined in claim 8 wherein the blade of the knife has a crescent shape and extends around the entire back side of the curved neck section.

References Cited

UNITED STATES PATENTS

| | | | |
|---|---|---|---|
| 692,134 | 1/1902 | Hall et al. | 294—55.5 |
| 1,020,788 | 3/1912 | Anderson | 7—14.4 |
| 1,133,021 | 3/1915 | Gunn | 7—14.4 X |

FOREIGN PATENTS

| | | |
|---|---|---|
| 21,494 | 8/1916 | Denmark. |
| 22,464 | 9/1917 | Denmark. |
| 36,026 | 5/1926 | Denmark. |

WILLIAM FELDMAN, *Primary Examiner.*

R. V. PARKER, Jr., *Assistant Examiner.*